(12) United States Patent
Mariman (10) Patent No.: US 7,404,366 B2
(45) Date of Patent: Jul. 29, 2008

(54) FLAT TYPE SEED METER DISK WITH PROTRUDED PICK UP ORIFICES

(75) Inventor: Nathan Albert Mariman, Mahomet, IL (US)

(73) Assignee: Deere & Company, Moline, IL (US)

( * ) Notice: Subject to any disclaimer, the term of this patent is extended or adjusted under 35 U.S.C. 154(b) by 395 days.

(21) Appl. No.: 11/293,518

(22) Filed: Dec. 2, 2005

(65) Prior Publication Data

US 2007/0125284 A1    Jun. 7, 2007

(51) Int. Cl.
*A01C 7/04* (2006.01)
*B65G 29/00* (2006.01)
(52) U.S. Cl. .......................... 111/185; 111/77; 221/266; 221/278
(58) Field of Classification Search .................. 111/77, 111/78; 221/211, 265, 266, 278; 222/369
See application file for complete search history.

(56) References Cited

U.S. PATENT DOCUMENTS

| 4,047,638 | A | * | 9/1977 | Harrer et al. | ................. 221/266 |
| 4,241,849 | A | * | 12/1980 | Harrer | ........................ 221/266 |
| 4,613,056 | A | | 9/1986 | Olson | .......................... 221/211 |
| 6,499,414 | B2 | | 12/2002 | Dunham | ..................... 111/174 |

* cited by examiner

*Primary Examiner*—Christopher J. Novosad

(57) ABSTRACT

A flat seed disk is provided with a series of circumferentially arranged seed retaining protrusions providing seed retention at locations offset axially from the remainder of the disk. The offset allows the seed to fall in the correct location of the seed tube to reduce unwanted seed bounce and provide better seed delivery to the ground and better seed spacing as compared to flat disks without the offset. In one embodiment, the protrusions have seed retaining faces opening generally in the direction of disk rotation. In other embodiments, the faces are angled away from the direction of rotation to reduce interference between released seed and adjacent protrusions, and trailing radial ledges can be provided to enhance seed retention.

20 Claims, 8 Drawing Sheets

FLAT TYPE SEED METER DISK WITH PROTRUDED PICK UP ORIFICES

FIELD OF THE INVENTION

The present invention is directed to a rotatable seed disk for a vacuum seed meter having offset for improved seed trajectory.

BACKGROUND OF THE INVENTION

Seed meters are used by agricultural seeding machines to control the rate at which seed is applied to a field. Air pressure meters use either positive or negative air pressure to direct seed to apertures formed in a rotating seed disk and to hold the seed in the apertures until a preselected release point is reached. Sealing or cut-off structure on the seed meter typically is used to isolate a portion of the rotatable seed disk from the air pressure source so that the seed is released from the apertures. The seed then follows a trajectory away from the disk into a seed tube or the like towards the ground.

Air pressure seed meters commonly utilize plastic seed disks which vary in configuration depending on the type and size of seeds being metered. For example, a vacuum meter may use either a celled seed disk or a flat seed disk installed at a given location on a driven hub. The seed trajectory off the disk in the release area typically varies with the type of seed disk being used. The trajectory off the celled disk tends to be more centered relative to the seed tube entry walls than the trajectory for the flat disk, which is closer to the proximate seed tube wall. If the trajectory for the celled disk is optimized, the seed drop will not be in the optimum location for the flat disk. As a result, the seeds released from the flat disk will be offset more from center and will tend to bounce off of the proximate wall instead of falling towards the desired location within the seed tube. The seed bounce off the proximate wall produces unwanted seed spacing variations. In commonly assigned and copending application Ser. No. 11/273,363 Flat Type Seed Meter Disk with Axially Offset Surface, a flat disk is described wherein apertures are spaced along a circumferential rim offset axially from the remainder of the disk to approximately duplicate the seed release location and characteristics of a cell type seed disk.

SUMMARY OF THE INVENTION

It is therefore an object of the present invention to provide an improved seed disk which overcomes the aforementioned problems. It is another object to provide such a seed disk for improved seed trajectory to reduce or eliminate unwanted seed bounce as the seed moves from the seed release point towards the ground.

It is a further object of the present invention to provide a seed disk configuration that provides generally identical seed trajectories for both a flat seed disk and a celled disk so that the meter can be placed in the same position for both seed disks.

A flat disk type circular seed disk is provided with circumferentially arranged seed attracting apertures. The apertures are located on a series of individual protrusions offset axially from the remainder of the disk and generally duplicate the seed release location and characteristics of a cell type seed disk. The offset allows the seed to fall in the correct location of the seed tube to reduce or eliminate unwanted seed bounce and provide better seed delivery to the ground and better seed spacing as compared to flat disks without the offset. In one embodiment of the invention, the protrusions have forward apertured walls facing the direction of rotation of the disk for aggressive stirring and seed pick up. In another embodiment, the protrusion forward walls are angled to have a substantial radial component for less aggressive stirring and different seed release characteristics. In a third embodiment, the apertures open in a radial direction, and a ledge member stirs and accelerates seeds and provides rear support for captured seeds.

These and other objects, features and advantages of the present invention will become apparent from the following description in view of the drawings.

DESCRIPTION OF THE PREFERRED EMBODIMENT

Figure 1:
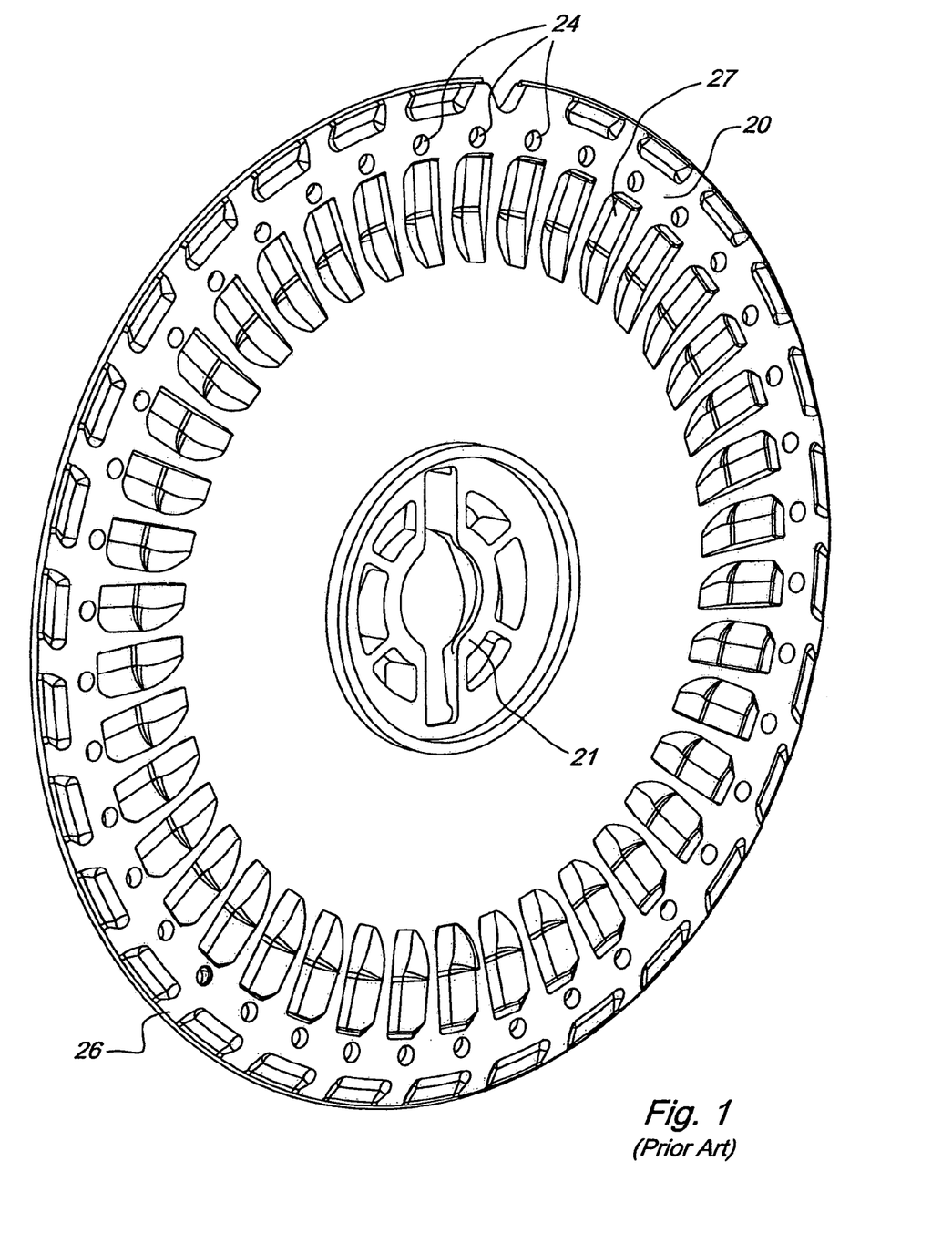
FIG. 1 is a perspective view of a flat type seed meter disk typical of the prior art.
Figure 2:
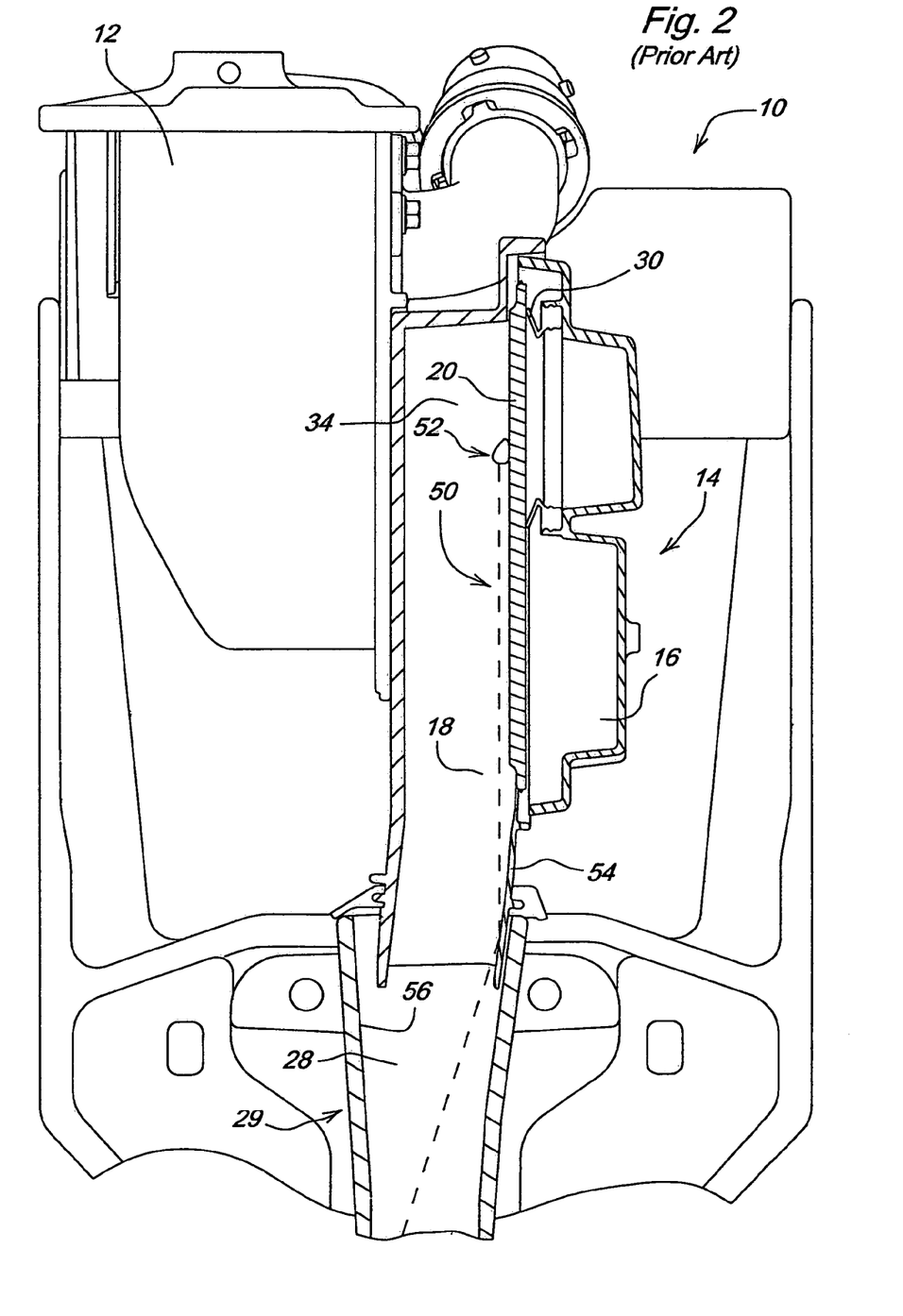
FIG. 2 a view partially in cross sectional showing a typical trajectory for the prior art seed disk of FIG. 1.
Figure 8:
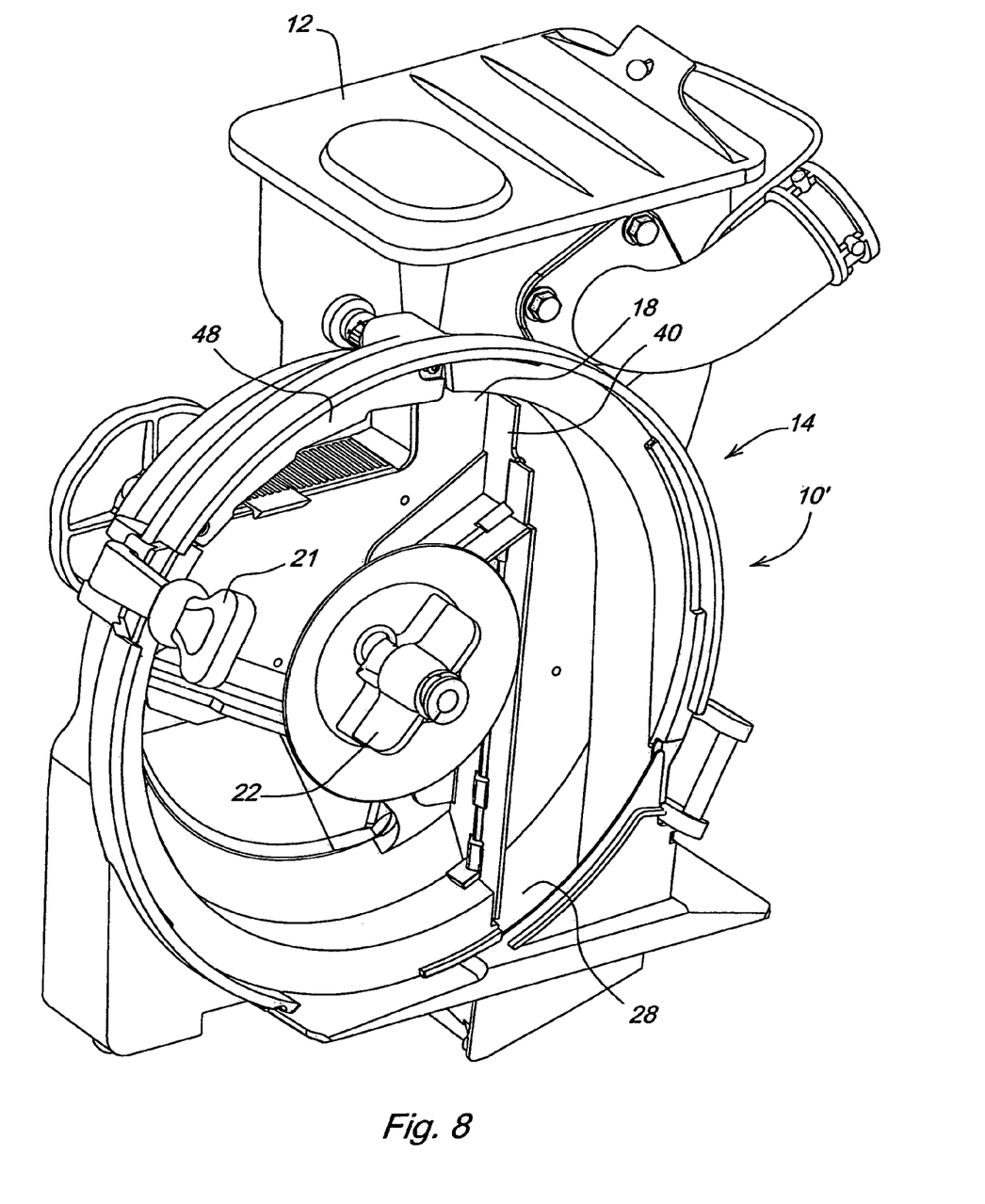
FIG. 8 is a perspective view of the seed meter with parts removed to show the double eliminator and brush retainers for the disk of FIG. 3.

Referring to FIGS. 1 and 2, a seed meter 10 in communication with a seed hopper 12 includes a housing 14 rotatably supporting a seed disk 20. The housing 14 as shown has a vacuum side 16 and a seed receiving side 18 which are hinged together and secured in a closed position by a conventional latching arrangement (see 21 of FIG. 8). The rotatable seed disk 20 includes a hub portion 21 secured to a drive coupling 22 (FIG. 8).

The seed disk 20, which is shown as a conventional flat sweet corn disk in FIGS. 1 and 2, includes a series of apertures 24 uniformly spaced radially inwardly of a serrated cleanout and stirring edge 26 and passing from the seed side of the disk 20 through to the vacuum side of the disk. Seed accelerating and stirring structure 27 extends radially inwardly from the apertures 24 on the seed side of the disk. As the periphery of the disk 20 passes through a supply or puddle of seed in the seed receiving side 18 of the housing 14, the vacuum communicated through the apertures 24 draws and holds seed against the apertures. The edge 26 and the structure 27 stir and accelerate the seed adjacent the disk to facilitate capture of the seed by the apertures 24.

The seed receiving side 18 communicates with a supply of seed in the hopper 12. An outlet 28 connects the interior of the seed meter 10 to a seed tube 29 or other delivery device for directing the seed to the ground. The vacuum side 16 of the seed meter 10 is provided with a seal 30 which defines a seed a seed release zone 34 where the vacuum is isolated from the apertures 24 to release the seeds held on the apertures of the disk 20. The vacuum side 16 is coupled to a vacuum source (not shown). Although the present invention is being described as being used on a vacuum or negative air pressure seed meter it could also be used on a positive air pressure seed meter.

Seed deposited in the hopper 12 flows downwardly from the hopper 12 through an inlet into the seed receiving side 18 of the housing 14. The seed forms a puddle at the bottom of the housing defined by the seed disk 20 and the seed receiving side 18. Brush retainers 40 (FIG. 8) form a barrier in the housing 14 that prevents seeds in the seed puddle from directly entering the outlet 28. A vacuum is applied to a seed trapping zone on the vacuum side 16 which draws air from the seed receiving side 18 through apertures 24. This flow of air attracts seeds to the apertures and holds the seeds on the apertures. Further rotation takes the seed out of the area defined by the seed trapping zone to the seed release zone defined by seal 30. No vacuum exists in the seed release zone so the seed is released from the seed disk and falls into outlet 28. From the outlet 28, the seed is directed through the seed tube 29 to the planting furrow. A doubles eliminator 48 is connected to the housing on the seed side of the disk to eliminate any incidences of multiple seeds in an aperture.

As can be seen in FIG. 2, a seed trajectory 50 extends downwardly from a seed release point 52. The trajectory 50 of the seed tends to brush an uppermost portion of a proximate wall 54 at the outlet 28 causing the falling seeds to bounce towards a distal wall 56. Additional seed bounce initiated as a result of the seeds hitting the wall close to the uppermost portion of the outlet causes unpredictable irregularity in seed spacing in the furrow.

Figure 3:
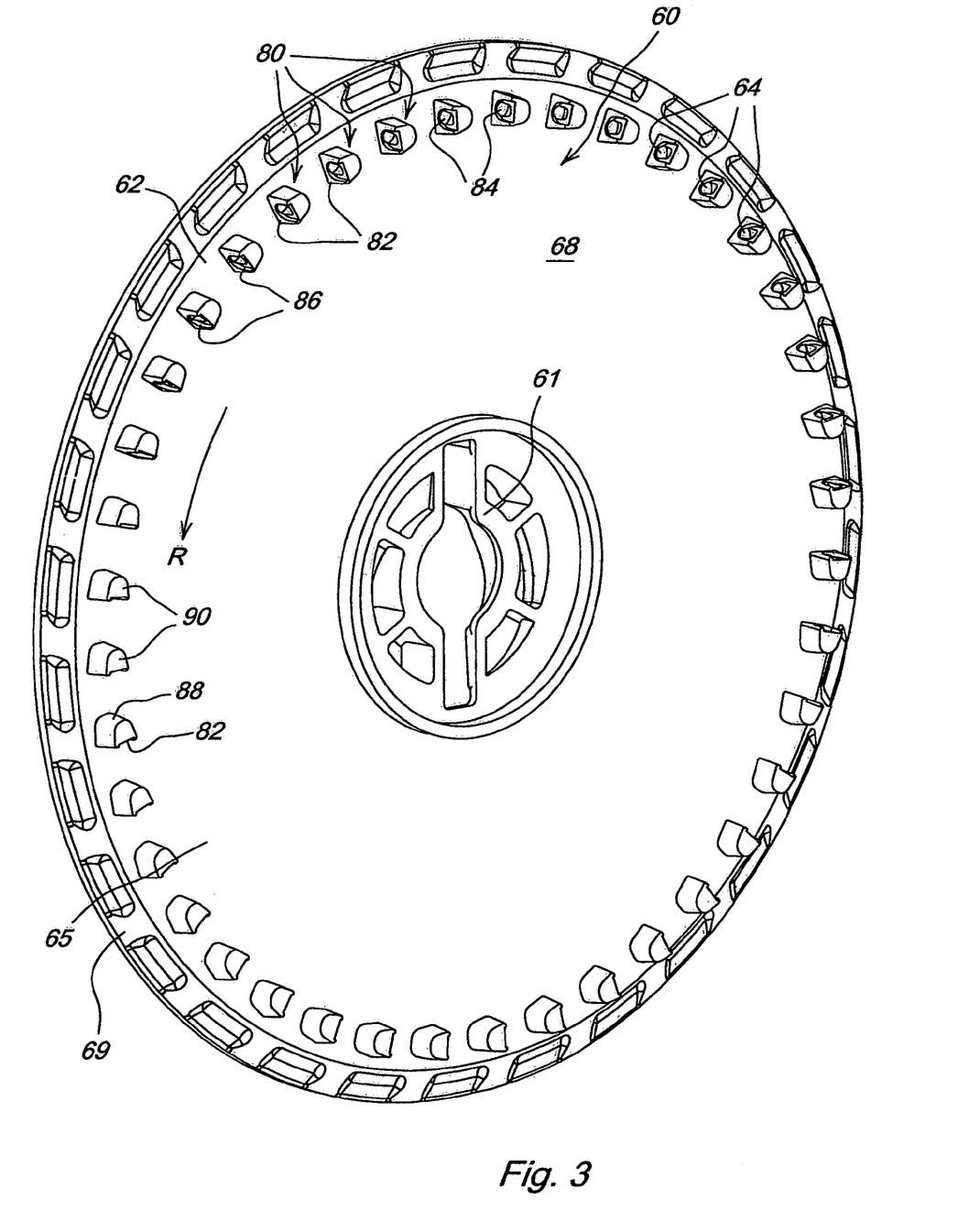
FIG. 3 is a perspective view of a flat type seed meter disk having protrusions providing axial offset for improved seed trajectory.
Figure 4:
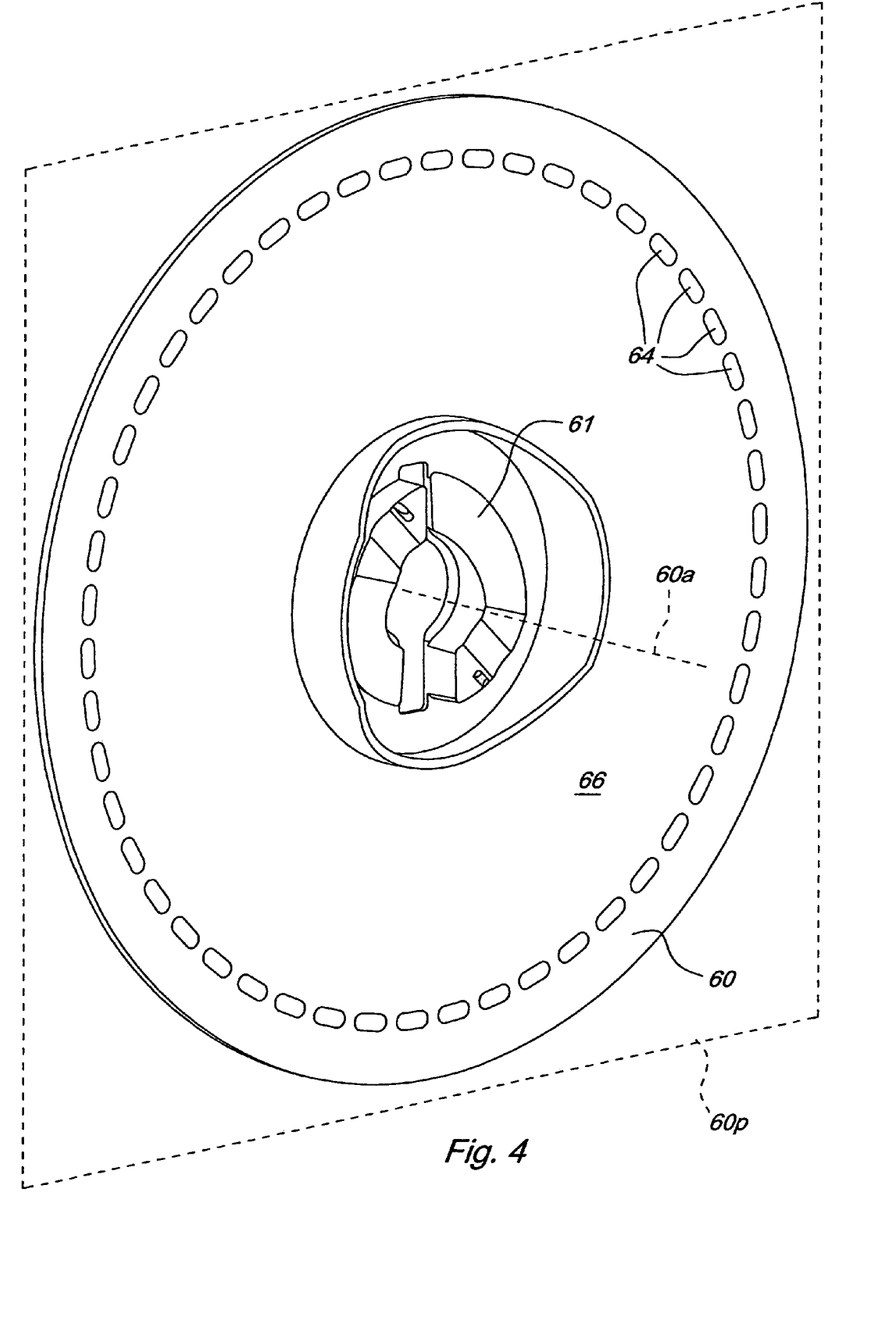
FIG. 4 is a perspective view of the rear side of the disk of FIG. 3.
Figures 5, 6, 7:
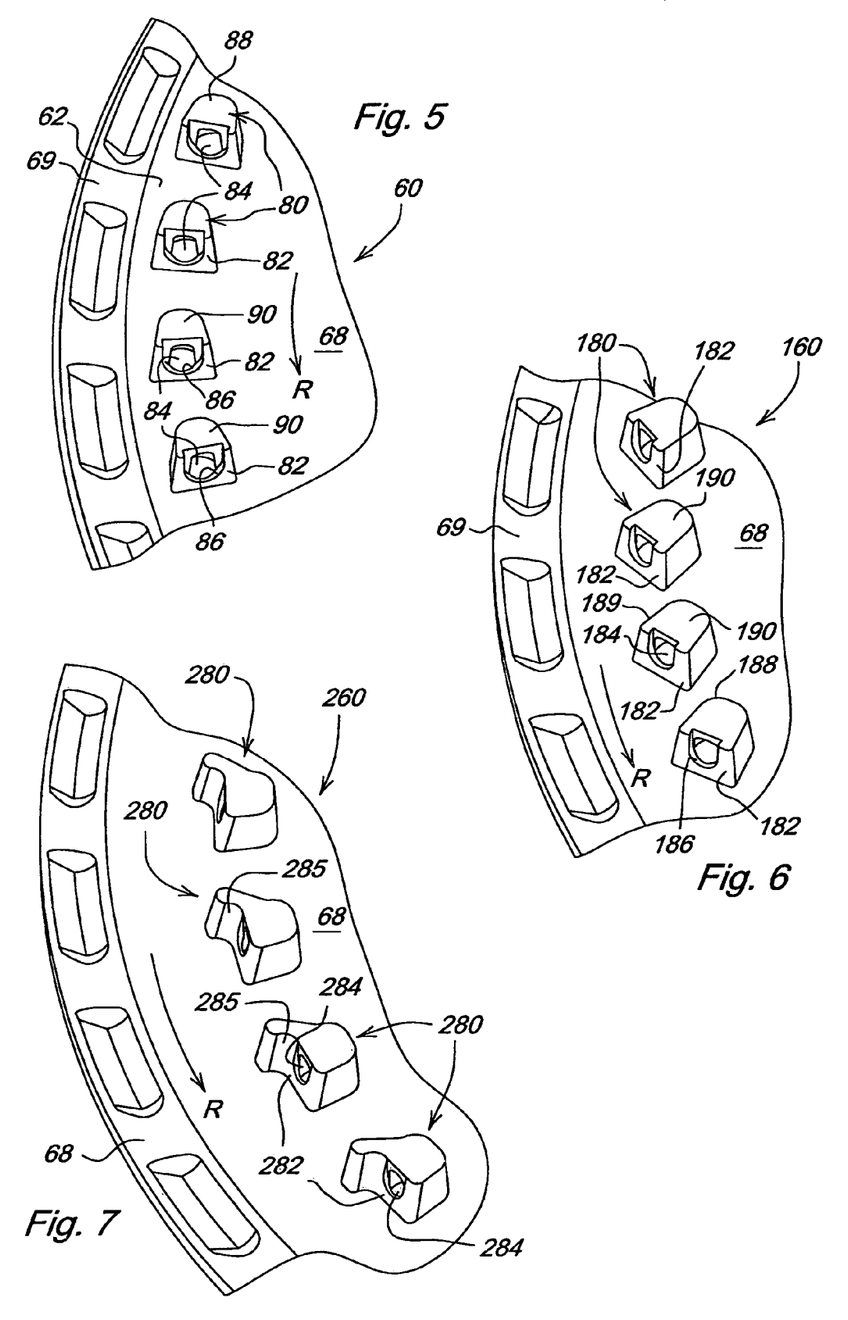
FIG. 5 is an enlarged perspective view of an outer circumferential portion of the seed disk of FIG. 3
FIG. 6 is a view similar to FIG. 5 but showing an alternate embodiment with protrusions having angled faces.
FIG. 7 a view of another embodiment of the seed disk having protrusions with radial apertures and with ledges facing generally in the direction of rotation adjacent the apertures.

Referring now to FIGS. 3-5, therein is shown an improved seed corn disk 60 having a central connection hub 61 and an outer circumferential portion 62. A plurality of apertures 64 are spaced uniformly about the circumferential portion 62 and extend from seed side 65 through to the opposite side 66 of the disk 60. The disk 60 rotates in a forward direction R generally in a rotational plane 60p about an axis 60a.

The outer circumferential portion 62 includes a plurality of dome-shaped members or protrusions 80 raised relative to a generally planar central portion 68. As shown in FIGS. 3 and 5, the protrusions 80 include seed retention walls 82 facing the direction of rotation R and opening at 84 to the corresponding apertures 64 adjacent U-shaped shoulders 86 in the walls. Trailing walls 88 of arc-shaped configuration extend upwardly from the surface of the portion 68 to a flat protrusion top portion 90. Seed stirring and accelerating structure 69 is located radially outwardly of the protrusions 80. The protrusions 80 also stir and accelerate the seed to facilitate capture and eliminate need for accelerating and stirring structure radially inwardly of the seed retention areas.

Figure 9:
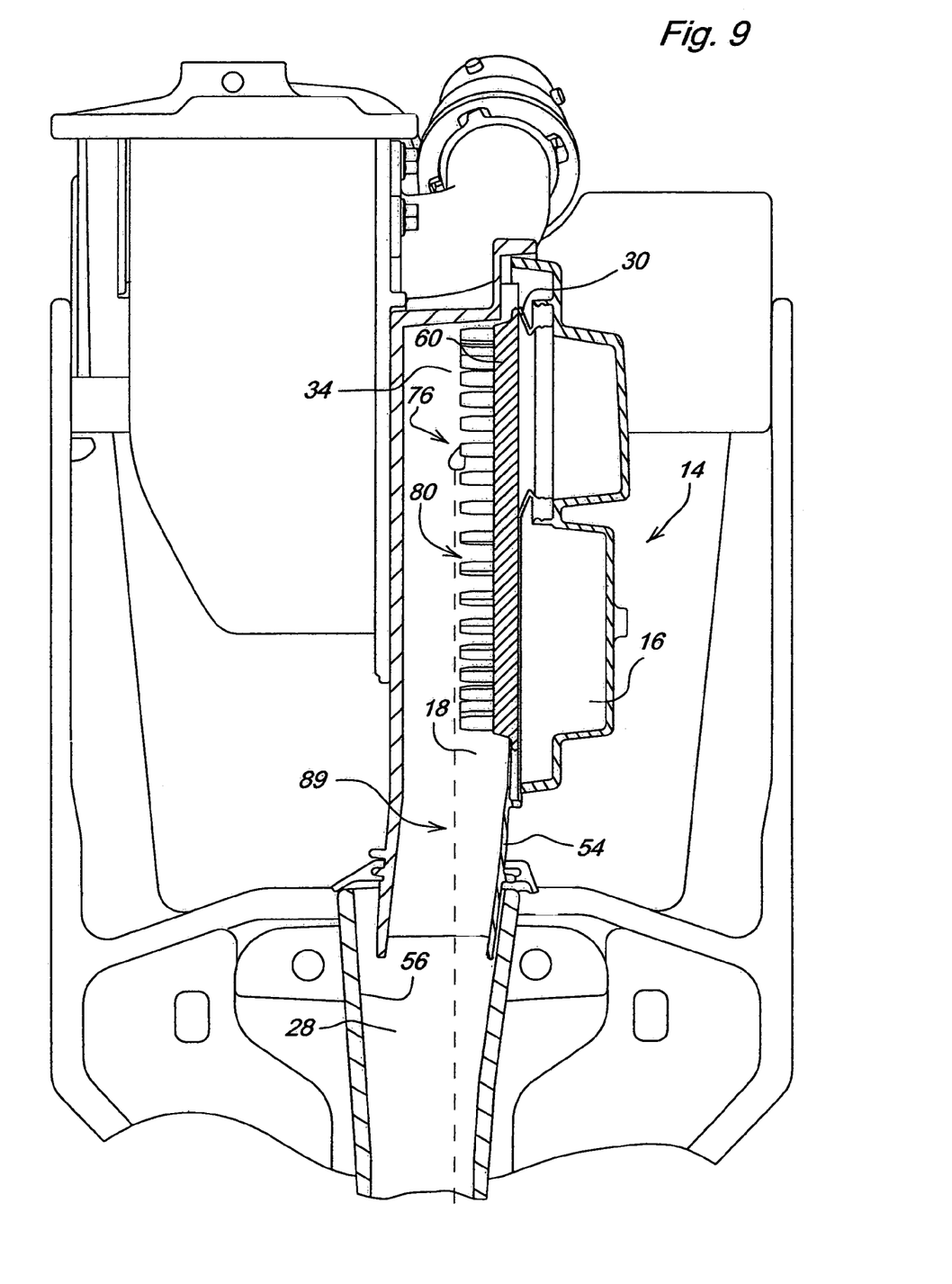
FIG. 9 is a view similar to FIG. 2 illustrating the improved trajectory of the seed disk with protrusions.

The configuration of the protrusions 80 shown in FIGS. 3 and 5 provides aggressive scooping of seed from the seed puddle. The protrusion face 82 is perpendicular to the tangent of the diameter of the disk which enhances seed scooping. Differential pressure communicated via openings 84 and apertures 64 captures and holds seed at the shoulder 86 against the seed retention walls 82. When the differential pressure is cut off, the seed is released from the walls 82 to follow the trajectory shown in FIG. 9. The offset provided by the protrusions 80 causes release point 76 of each captured seed to extend axially in the direction of the seed side 65 of the disk so that the seed falls more centrally relative to the outlet 28 along a trajectory 89 offset inwardly from the proximate wall 54, compared to the trajectory 50 for the prior art disk 20 of FIG. 2. The curved trailing walls 88 help eliminate trajectory-altering interference between released seed and an adjacent protrusion 80. The new trajectory 89 reduces unwanted seed bounce and results in more uniform seed spacing in the furrow.

Referring to FIG. 6 protrusions 180, which are similar in construction to the protrusions 80 described above, include protrusion faces or seed retaining walls 182 angled radially outwardly with respect to the direction of rotation R. As shown, the faces 182 form an acute angle of approximately 45 degrees with respect to a radial line extending from the center of the disk 160 through the protrusion 180. The walls 182 open at 184 to the corresponding apertures 64 adjacent U-shaped shoulders 186 in the walls. Trailing walls 188 include angled wall portions 189 extending rearwardly and radially inwardly from the faces 182 and are curved at the aft portion. The walls 182 and 188 extend upwardly from the surface of the portion 68 to a flat protrusion top portion 190. The configuration of the protrusion 180 with the angled face 182 facilitates seed release at the three o'clock position without hitting the preceding protrusion 190.

Referring to FIG. 7, another embodiment is shown on disk 260. The general configuration of the disk 260 is similar to that described for FIGS. 5 and 6 above, but protrusions 280 include radially facing seed capturing walls 282 opening radially outwardly at 284 with little or no angular component facing in the direction of rotation R. To provide seed support, seed scooping and acceleration, a trailing ledge or radial extension 285 is offset behind the seed capturing opening 284. The radially facing seed capturing walls 282 eliminate interference between a released seed and the preceding protrusion 280.

Figure 10:
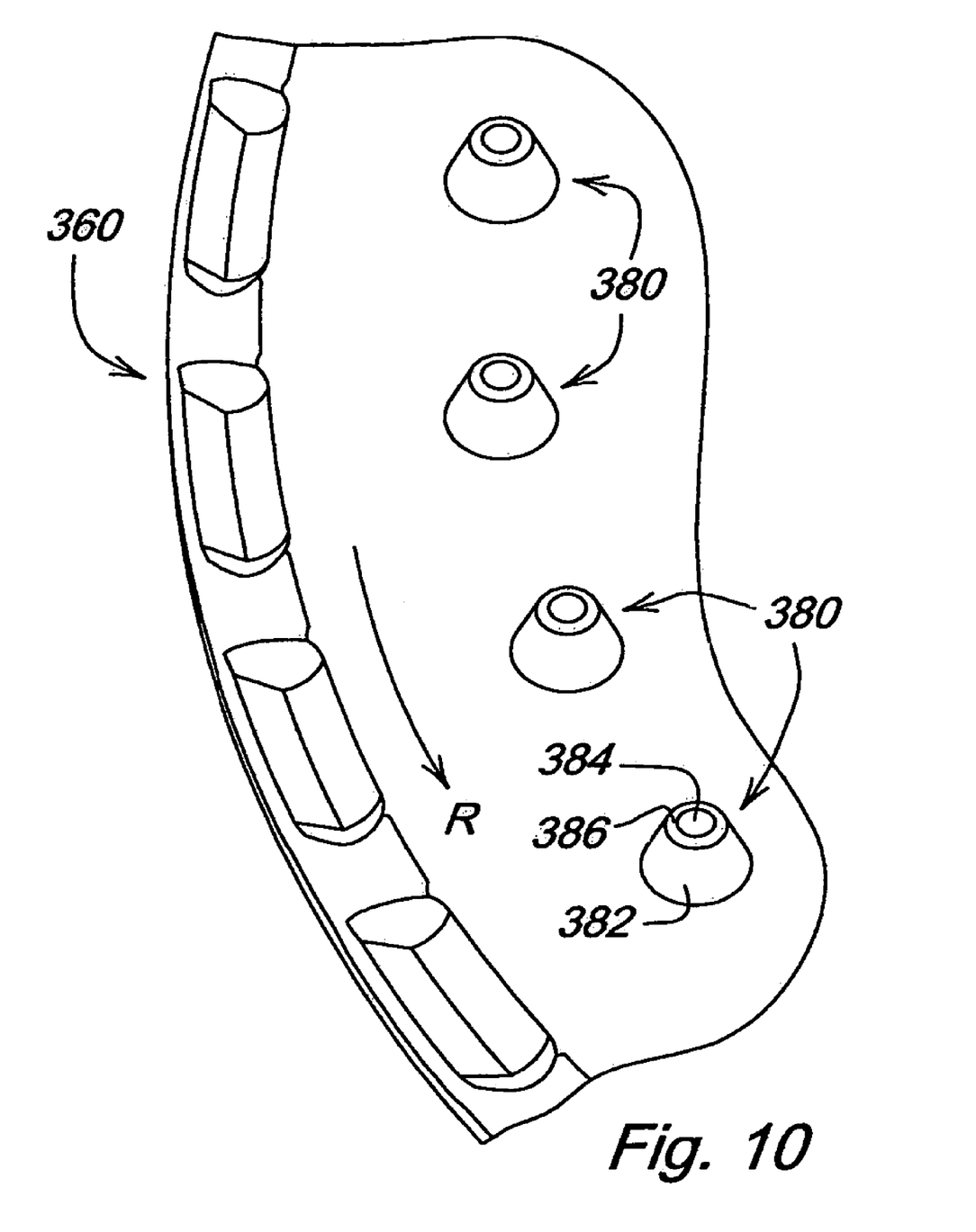
FIG. 10 is a view of a portion of a seed disk having protrusions with axially directed seed retention areas.

Another embodiment is shown on a portion of a disk 360 in FIG. 10. Protrusions 380 have walls 382 defining a truncated cone shape wherein the apertures 64 open at 384 in the axial direction. Air pressure communicated through the apertures hold seeds on circular ledge areas 386. At the release position, the pressure is cut off, and the seeds fall in a trajectory offset from the adjacent planar portion of the disk 360.

Having described the preferred embodiment, it will become apparent that various modifications can be made without departing from the scope of the invention as defined in the accompanying claims.

The invention claimed is:

1. A flat type seed disk for an air pressure seed meter comprising:
   a circular disk member having a generally planar seed contacting side and an opposite rear side and adapted for rotation in a forward direction about a disk axis with the seed contacting side in communication with a source of seeds;
   the disk member including a plurality of protrusions extending axially above the planar seed contacting side, the protrusions including apertures opening from the rear side to the seed contacting side to define seed retention areas on the protrusions; and
   wherein the seed retention areas are offset axially from the planar seed contacting side for release of seed at release locations offset axially from the planar seed contacting side.

2. The disk as set forth in claim 1 further comprising an agitation area radially outwardly of the protrusions, wherein the protrusions and the agitation area accelerate the seed to assist in pick up of the seeds at the apertures.

3. The disk as set forth in claim 1 wherein the seed retention areas have leading surfaces facing in the forward direction.

4. The disk as set forth in claim 1 wherein the seed retention areas are angled radially and are offset rearwardly from forwardmost extremities of the protrusions.

5. The disk as set forth in claim 1 wherein the protrusions include leading faces and the apertures open from leading faces.

6. The disk as set forth in claim 1 wherein the apertures open in the forward and radially outward directions.

7. The disk as set forth in claim 1 wherein the apertures open from the protrusions in a radially outward direction and including a seed accelerating and capturing ledge located adjacent the apertures.

8. The disk as set forth in claim 1 wherein the protrusions have generally flat leading faces and arc-shaped trailing walls to reduce interference with seeds released from adjacent protrusions.

9. A flat type seed disk for an air pressure seed meter comprising:
   a circular disk member having a diameter, a seed contacting side and an opposite rear side, the disk adapted for rotation in a forward direction generally in a disk plane about a disk axis with the seed contacting side in communication with a source of seeds;
   the disk member including a central generally planar portion;
   seed pick up protrusions extending axially from the planar portion and offset from the planar portion;
   apertures extending through the protrusions from the rear side to the seed contacting side to communicate a source of seed capturing air pressure to the protrusions; and
   wherein the protrusions define seed release areas adjacent the apertures, the seed release areas offset axially from the planar portion for releasing the seed a distance away from the planar portion.

10. The disk as set forth in claim 9 wherein the protrusions include leading walls and the apertures open from the leading walls generally in the direction of rotation.

11. The disk as set forth in claim 9 wherein the protrusions include seed retention walls, the walls angled to include a radial component and a leading component generally in the forward direction.

12. The disk as set forth in claim 11 wherein the apertures are formed in the seed retention walls.

13. The disk as set forth in claim 9 wherein the protrusions include radially outward facing walls and the apertures are formed in the radially outward facing walls.

14. The disk as set forth in claim 13 further comprising seed capturing ledges extending radially outwardly from the radially outward facing walls.

15. The disk as set forth in claim 9 wherein the protrusions comprise truncated cones and the apertures open from the truncated cones generally in the direction of the disk axis.

16. A flat type seed disk for an air pressure seed meter comprising:
   a circular disk member having a diameter, a seed contacting side and an opposite rear side, the disk adapted for rotation in a forward direction generally in a disk plane about a disk axis with the seed contacting side in communication with a source of seeds;
   the disk member including a central portion lying generally in a plane;
   seed pick up protrusions offset axially above the central portion;
   the protrusions including seed retaining walls having apertures communicating seed capturing air pressure from the rear side to the seed contacting side; and
   wherein the protrusions define seed release areas offset axially from the central portion for releasing the seeds a distance away from the plane.

17. The disk as set forth in claim 16 wherein the central generally planar portion is devoid of seed accelerating members, the protrusions providing seed acceleration as the disk rotates.

18. The disk as set forth in claim 16 wherein the protrusion walls are angled with respect to the direction of rotation to reduce contact of seeds released from one of the seed release areas with an adjacent protrusion.

19. The disk as set forth in claim 16 wherein the seed retaining walls have a substantial radial component, and further comprising radial ledges extending outwardly from the retaining walls.

20. The disk as set forth in claim 19 wherein the radial ledges are formed in the protrusions.

\* \* \* \* \*